United States Patent
Karr (10) Patent No.: US 7,791,982 B2
(45) Date of Patent: Sep. 7, 2010

(54) IMPACT ENERGY POWERED GOLF BALL TRANSMITTER

(76) Inventor: Lawrence J. Karr, 445 15th St., Santa Monica, CA (US) 90402

(*) Notice: Subject to any disclaimer, the term of this patent is extended or adjusted under 35 U.S.C. 154(b) by 291 days.

(21) Appl. No.: 11/772,006

(22) Filed: Jun. 29, 2007

(65) Prior Publication Data

US 2009/0003136 A1    Jan. 1, 2009

(51) Int. Cl.
G01S 3/802    (2006.01)
A63B 43/00    (2006.01)

(52) U.S. Cl. .................................. 367/140; 473/353

(58) Field of Classification Search .............. 367/140; 473/353, 407; 320/166
See application file for complete search history.

(56) References Cited

U.S. PATENT DOCUMENTS

| | | | |
|---|---|---|---|
| 3,782,730 A | 1/1974 | Horchler | 273/213 |
| 5,112,055 A | 5/1992 | Barnhill | 273/213 |
| 5,132,622 A | 7/1992 | Valentino | 324/326 |
| 5,423,549 A | 6/1995 | Englmeier | 273/213 |
| 5,626,531 A | 5/1997 | Little | 473/353 |
| 5,662,534 A | 9/1997 | Kroll et al. | 473/353 |
| 6,803,575 B2 | 10/2004 | McLaughlin | 250/338.1 |
| 7,059,974 B1 | 6/2006 | Golliffe et al. | 473/351 |
| 7,095,312 B2 | 8/2006 | Erario et al. | 340/323 |
| 7,140,972 B2 | 11/2006 | Redwine et al. | 473/280 |
| 7,207,902 B1 | 4/2007 | Hamlin | 473/353 |
| 2005/0060116 A1* | 3/2005 | Yeung | 702/120 |
| 2005/0227791 A1* | 10/2005 | McCreary et al. | 473/407 |
| 2006/0122007 A1* | 6/2006 | Savarese et al. | 473/351 |
| 2007/0251294 A1* | 11/2007 | Tanaka et al. | 73/12.01 |
| 2008/0252483 A1* | 10/2008 | Hodges | 340/905 |
| 2008/0255609 A1* | 10/2008 | Opie | 606/213 |
| 2009/0003136 A1* | 1/2009 | Karr | 473/353 |

FOREIGN PATENT DOCUMENTS

GB    1172449    7/1968

* cited by examiner

*Primary Examiner*—Dan Pihulic
(74) *Attorney, Agent, or Firm*—Gifford, Krass, Sprinkle, Anderson & Citkowski, P.C.

(57) ABSTRACT

Electrical power can be generated from impact based energy, such as from a golf ball being struck by a golf club. One or more piezo-electric devices, which are embedded in the core of the golf ball, are stressed by the impact and generate energy. Each piezo-electric device generates energy when stressed, which is then rectified and stored in a capacitor circuit. The stored energy in the capacitor circuit is used to power a transmitter to emit energy via an antenna, including all necessary electronics such as an oscillator, a modulator, and various control and logic circuits. The transmitted signals can be received by a hand held locator device. The described impact generated energy powers the transmitter a sufficiently long amount of time for the golfer to locate the golf ball. The impact based energy generation can also be used for other non-golf applications.

27 Claims, 5 Drawing Sheets

IMPACT ENERGY POWERED GOLF BALL TRANSMITTER

FIELD OF THE DISCLOSURE

The present disclosure generally relates to a device that can be formed in a golf ball so that the golf ball can be located during use. More particularly, the present disclosure described a device that can convert impact energy from a golf swing into electrical energy so that a transmitter that is embedded in the golf ball can emit signals to facilitate locating the golf ball.

BACKGROUND

A familiar problem for golfers is finding their golf ball once struck. A typical golf swing can result in hitting the golf ball over distances between several feet and several hundreds of yards. Ideally, the golfer can visually track the location of the ball once struck and thus easily find the golf ball. However, any number of a variety of environmental conditions may make it difficult to find the location of the golf ball. For example, the golfer may be playing in rain or fog conditions that make it very difficult to find the ball. Even on a bright sunlit day, the golfer may simply lose the ability to track the ball because of sun glare. Moreover, the golf ball may land in an environment (e.g., a wooded region, long grass, brush, bushes, etc.) that occludes a view to the ball. Beyond the embarrassment of losing the golf ball and any imposed penalties in the game itself, golf players suffer a loss of time and broken concentration from trying to locate the golf ball.

Various efforts have been proposed to facilitate locating golf balls. For example, GB1172449 teaches placing radioactive material inside a golf ball, and using a handheld Geiger counter to locate the ball. Since the amount of radioactive material that can be placed in the golf ball is limited due to human health and safety considerations, the radioactive detection method has a very limited detection range.

U.S. Pat. No. 5,132,622 to Valentino describes a golf ball with a metal center, where the golf ball can be found by scanning a metal detector over an area. The metal detector method also has limited range and is susceptible to false positive readings from extraneous metal materials located in the vicinity of the golf ball.

U.S. Pat. No. 7,140,972 to Redwine et al. describes a golf ball with an outer translucent later and an inner core that includes a luminescent liquid such as Cyalume, which can be activated by the impact of the golf club. Once activated, the golf ball may be more visible in low-light conditions due to the luminescent glow from the chemicals. However, in bright light conditions the luminescence is of no benefit.

U.S. Pat. No. 6,803,575 to McLaughlin describes treating an ordinary golf ball with an emulsion that deposits a hologram in the dimples. When illuminated by a laser beam at the proper pre-selected wavelength, the golf ball will reflects the laser beam. A hand held analyzer illuminates and detects the golf ball based on the reflected light at the specified wavelength. The hand held unit must be carefully aimed or detection is not possible.

U.S. Pat. No. 3,782,730 to Horchler describes a magnetically actuated switch, a radio oscillator circuit, and a battery located at the core of the golf ball. The radio oscillator is tuned on and off by the magnetically actuated switch. The radio signal from the radio oscillator can be monitored by the player to locate the golf ball whenever it is temporarily lost.

In U.S. Pat. No. 5,423,549 to Englmeier, a golf ball is describes that includes a rechargeable battery system and a transmitter that transmits electromagnetic signals. An external voltage source is used to recharge the battery through a wireless transmission. A mobile signal receiving unit is used to receive the transmitted signals from the golf ball to assist the golf player in locating the golf ball.

U.S. Pat. No. 5,112,055 to Barnhill describes a golf ball with a battery powered emitter that is activated by a switch when the golfer strikes the ball during a golf swing. Once active, the emitter provides an audible sound so that the golfer can locate the golf ball.

U.S. Pat. No. 5,626,531 to Little describes a transducer tag that is located within the golf ball, where the transducer tag includes a tuned capacitance that is activated by radiated energy from an external source. A detectable electronic signal is emitted from the golf ball when exposed to an electronic field at the proper frequency with sufficient energy to activate the transducer tag.

U.S. Pat. No. 5,662,534 to Kroll et al. describes a radio frequency reflector that is embedded in the golf ball. A monitor transmits a series of pulsed radio frequency beams to the golf ball, and analyzes the reflected radio waves.

U.S. Pat. No. 7,059,974 to Golliffe et al. describes a golf ball with a coded chip such as an RFID tag embedded in a resilient member. The resilient member is arranged to dampen shock to the coded chip, and can also prevent overheating of the coded chip during the manufacturing process.

U.S. Pat. No. 7,207,902 to Hamlin describes a golf ball with a passive transmitter and a pressure sensor, both located in a core region of the ball. The pressure sensor is used to determine golf course conditions surrounding the golf ball such as mud, dirt, water, sand, etc. A hand held unit is used to transmit energy at a selected frequency that can be received by the passive transmitter in the golf ball, which then transmits a response for reception by the hand held unit. Upon reception of the response, the hand held unit can determine distance to the golf ball and process the environmental conditions around the golf ball.

U.S. Pat. No. 7,095,312 to Carter describes a golf ball with a rechargeable power source, a GPS receiver, a GPS antenna, a motion sensor, a detector, a microprocessor, an RF transmitter and an RF antenna, all located within a core region of the golf ball. Prior to use, the rechargeable power source is charged and the GPS receiver attains a fix on a position from a GPS satellite. When the golf ball is placed in an area of use such as on a tee or mat in the tee box, the microprocessor is signaled by the detector to begin receiving and/or transmitting via either the GPS receiver/antenna or the RF transmitter/ antenna. Additional positioning information is captured and recorded by the microprocessor while the golf ball is in flight. The motion sensor works with the microprocessor to detect when the golf ball has reached a resting position so that the collected positioning data can be transmitted via the RF transmitter/antenna. The collected data can be analyzed to evaluate flight path attributes such as traveled distance, speed, direction, loft, and trajectory.

While each of the above described golf ball devices may be suitable for the purposes for which they were designed, they may not be suitable in many other applications. The present disclosure contemplates each of the above described golf ball locators and identifies shortcomings in arriving at a novel solution.

DETAILED DESCRIPTION

Various embodiments will be described in detail with reference to the drawings, where like reference numerals represent like parts and assemblies throughout the several views. References to various embodiments do not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary items. The term "coupled" can mean a direct connection between items, an indirect connection through one or more intermediaries, or communication between items in a manner that may not constitute a physical connection. The term "circuit" can mean a single component or a plurality of components, active and/or passive, discrete or integrated, that are coupled together to provide a desired function. The term "signal" can mean at least one current, voltage, charge, data, magnetic field, electrical field, electro-magnetic field or other such identifiable quantity including electrically coupled and magnetically coupled signals.

Briefly stated, the present disclosure generally relates to a system, method and apparatus that generates electrical power from impact based energy. Electrical power can be generated from impact based energy such as from a golf ball being struck by a golf club. One or more piezo-electric devices, which are embedded in the core of the golf ball, are stressed or strained (hereinafter referred to as stress for simplicity) by the impact and generate energy. Each piezo-electric device generates energy when stressed, which is then rectified and stored in a capacitor circuit. The stored energy in the capacitor circuit is used to power a radio frequency transmitter to emit energy via an antenna, including all necessary electronics such as an oscillator, a modulator, and various control and logic circuits. The transmitted signals can be received by a hand held locator device. The described impact generated energy powers the transmitter a sufficiently long amount of time for the golfer to locate the golf ball. The impact based energy generation can also be used for other non-golf applications.

Overview of the Operating Environment

Figure 1:
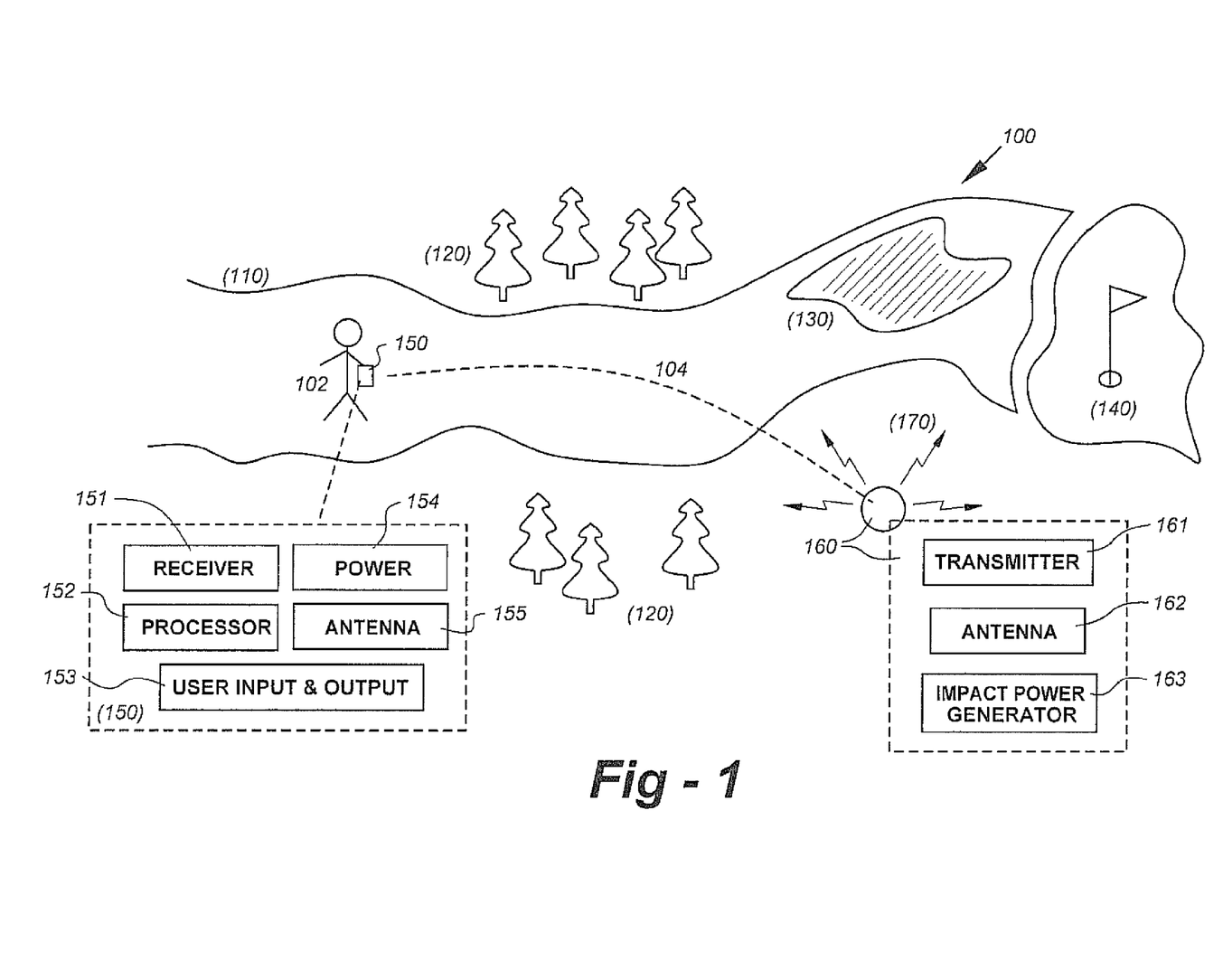
FIG. 1 is an illustration of a golf ball locator system as used in a golf course environment in accordance with the present disclosure.

FIG. 1 is an illustration of a golf ball locator system (150 and 160) as used in a golf course environment (100) in accordance with the present disclosure. The example golf course environment (100) includes a fairway (110), trees (120), water or sand hazards (130), and a putting green (140). During a game of golf, a golfer (102) strikes a golf ball (160) with a golf club such that the golf ball travels via a path (104). The golf ball (160) may come to rest in a location that is outside of the view of the golfer (102) for any number of reasons. For example, the golf ball may be lost in a tree laden area (120), caught in a sand trap or water hazards (130), located in brush or tall grass (not shown), or even on the fairway (110) in an area out of view. When the golfer (102) wishes to locate the golf ball (160), the golfer (102) activates a locator device (150) that listens for the transmission from the transmitter located in the golf ball (160). The locator device (150) can then determine a direction and distance to the golf ball (160) based on the received signals and provide an indication to the golfer (1020 to assist in locating the golf ball (160).

An example locator device (150) includes a receiver (151), a processor (152), a user input and output interface (153), a power source (154), and an antenna (155). The various electronics such as the receiver (151), the processor (152) and the input and output interface (153) can be powered by the power source (154), which can be a regulated supply or an unregulated supply. In one example, the power source (154) is simply one or more battery devices. The golfer (102) activates the locator device (150) so that the receiver (151) can receive signals from the antenna (155) with the frequency band of interest for the golf ball (160). The processor (e.g., a microprocessor, a micro-controller, a digital signal processor (DSP), or an application specific integrated circuit (ASIC)) can be arranged to coordinate the operation of the receiver (151), the input and output interfaces (153), the power source (154) and the antenna (155).

In addition to determining distance and direction to the golf ball (160), the processor (152) in the locator device (150) can be arranged to provide any number of signal processing and control functions. Example signal processing functions include decoding, decrypting or descrambling signals, filtering signals, correlating signals, limiting signals, and other signal processing functions. Example control functions include, adjusting the receiver for the proper channel or frequency band, automatically shutting power when the locator device (150) is not in use, monitoring the input interface (153) for user input, controlling the output interface (153) such as a video display, an LCD display a sound processor, and the like.

In one example, the processor (152) in the locator device (150) is arranged to decode signal transmissions (170). The signal transmissions (170) may be encoded with a unique identifier that identifies the specific golf ball so that golfers can locate their own golf balls without a false positive signal for another golfer's golf ball. The signal transmissions (170) can be further encoded to minimize signal interference from other sources such as cellular telephones, cell towers, wireless-fidelity or wi-fi access points, high power electrical lines, as well as other environmental conditions. The signal transmissions (170) can be any appropriate high frequency transmission such as, for example a narrowband signal transmission or a spread spectrum transmission.

An example golf ball (160) includes embedded therein a radio frequency transmitter system (161), an antenna (162), and an impact based power generator (163). The radio frequency transmitter system (161) is arranged to emit a radio frequency transmission (170) via the antenna (162) when powered by the impact based power generator (163). The radio frequency transmitter system (161) can be arranged to modulate signals (e.g., amplitude modulated, frequency modulated, pulse modulated, phase modulated, etc.) in a specified frequency format (e.g., narrowband or spread spectrum) for reception by the locator device (150). The transmitter (161) may also be arranged to encode, encrypt or scramble the transmission as may be desired.

The various blocks depicted for the locator device (150) are functional partitions and that can be combined together or separated into additional functional blocks. Similarly, the various blocks depicted for the golf ball (160) are functional partitions that can be also be combined together or separated into additional functional blocks. Moreover, the functional blocks can be implemented as separate physical portions, or combined into one or more integrated portions as may be desired by the specific application.

Evaluation and Identification of Some Problems to be Solved

The presently disclosed system is a system for locating golf balls which may have been hit into the rough or other environmental condition rendering the golf ball relatively invisible with unaided vision. A particular problem identified in the present disclosure is that the transmitter or signaling device in the golf ball requires a significant amount of energy for operation.

A transmitter from an external source might be used to transmit RF energy towards the golf ball (using a feed horn that is a distance (r) away from the golf ball). In this example, diodes that are placed in the golf ball are energized by the RF energy and generate high frequency harmonics that are emitted. A receiver that is located in the same housing as the transmitter can be configured to sense the high frequency emissions and determines the location of the golf ball. However, for a practical antenna dimension (less than about 3 cm) for a golf ball, the back scattered high frequency harmonics are of relatively low power (~½ mW) for a short time duration (~1 msec) resulting in a very limited range.

One possible solution is to place a capacitor inside a golf ball, and to periodically charge the capacitor with an induction coil that is located internally to the golf ball. Prior to use, the golf ball is placed on a surface of an external charger device that includes another induction coil. The external induction coil is energized and energy is coupled to the internal induction coil of the golf ball. Since the charge stored in the capacitor is easily depleted, the ball must be charged before each use presenting a considerable inconvenience to the golfer. Also, the golf ball and the charger device alike may require coils at several orientations to be certain that a randomly oriented golf ball can be successfully charged. The golf ball could be randomly spun during inductive charging, which might allow a permanent magnet's constant field to be used for charging. The use of induction coils is only practical when the coil develops sufficient power from the charging field. This can present difficulties when the generating coil is far separated from the inducing coil, and is also when the coil is distant and is small with respect to the separation between the magnetic source and itself.

A radio-isotope decay generator could be used to power a beta-voltaic generator sufficient to operate the transmitter in the golf ball. However, during normal use golf balls become damaged (e.g., the outer covering is cracked or split, the inner core material deforms and begins to lose its elastic properties, etc.) and are considered expendable such that it is impractical for them to be very expensive. The radio-isotope decay generator would require a sizable energy storage device (e.g., a very large capacitor) to generate a sufficient energy burst, and radio-isotopes are generally expensive. Moreover, radio-isotopes present public safety and various regulatory licensing issues rendering them unusable in recreational products.

Internal chemical batteries also have various issues which make them an impractical energy source for a golf ball transmitter. During the manufacturing process, golf balls are vulcanized with temperatures in the range from around 260 degrees Fahrenheit to 480 degrees Fahrenheit. As chemical and diffusion processes generally follow some exponential temperature rate equations, an internal chemical battery would likely be destroyed during the vulcanization process. Chemical batteries also have a finite storage time before they degrade. Moreover, golf balls can undergo very high acceleration when struck on a long tee shot (in excess of 10,000 times the force of gravity), which can result in further shortening the battery life due to the extreme acceleration.

Rechargeable batteries have similar problems to the chemical batteries described above. A photovoltaic battery cell could be designed that is exposed to sunlight for recharging the battery. For example, a golf ball can be constructed with small light transmitting sections that can provide the equivalent of a few square millimeters of sun exposure area. On sunny days a total solar flux of 0.01 watts can be used to recover approximately 1 mW of power. However, the power level could drop by a factor of 30 on cloudy days. Moreover, the golf ball design is restricted since it must admit light while remaining sealed against moisture.

Impact Power Generation

The present disclosure provides an elegant solution not found in prior implementations, where energy that is generated from a golfers swing is used to generate power for a transmitter circuit that is useful for locating the golf ball. The golfers swing generates a considerable amount of kinetic energy (e.g., on the order of 100 joules). The presently disclosed golf ball devices include a piezo-electric device. Upon impact with the golf ball device, the piezo-electric device converts a portion of the kinetic energy from the impact of the golfers swing into electrical energy.

Piezoelectricity is the ability of crystals and certain ceramic materials to generate a voltage in response to applied mechanical stress. The piezoelectric effect is reversible in that piezoelectric crystals can change shape by a small amount (about 1%) and then return to their original state while still retaining their crystalline properties. In addition to crystals of tourmaline, quartz, topaz, cane sugar, and Rochelle salt, many other materials exhibit the effect, including quartz analogue crystals like berlinite ($AlPO_4$) and gallium orthophosphate ($GaPO_4$), ceramics with perovskite or tungsten-bronze structures ($BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb2KNb5O15$). Some plastic film materials such as Kynar film, a popular polyvinylidene fluoride film material, also have strong piezoelectric properties.

Direct piezoelectricity of some substances like quartz can generate potential differences of thousands of volts. In a piezoelectric crystal, positive and negative electrical charges in the crystal are separated, but symmetrically distributed, so that the crystal overall is electrically neutral. Each of these sites forms an electric dipole. Dipoles that are near one another tend to be aligned in regions called Weiss domains. When a mechanical stress is applied to the crystal, the symmetry of the positive and negative electrical charges is disturbed such that a voltage is generated across the material. For example, a 1 cm cube of quartz crystal can produce up to 12,500 volts when a 500 lb force (2 kN) is correctly applied to the crystal.

Example Implementations

Figure 2:
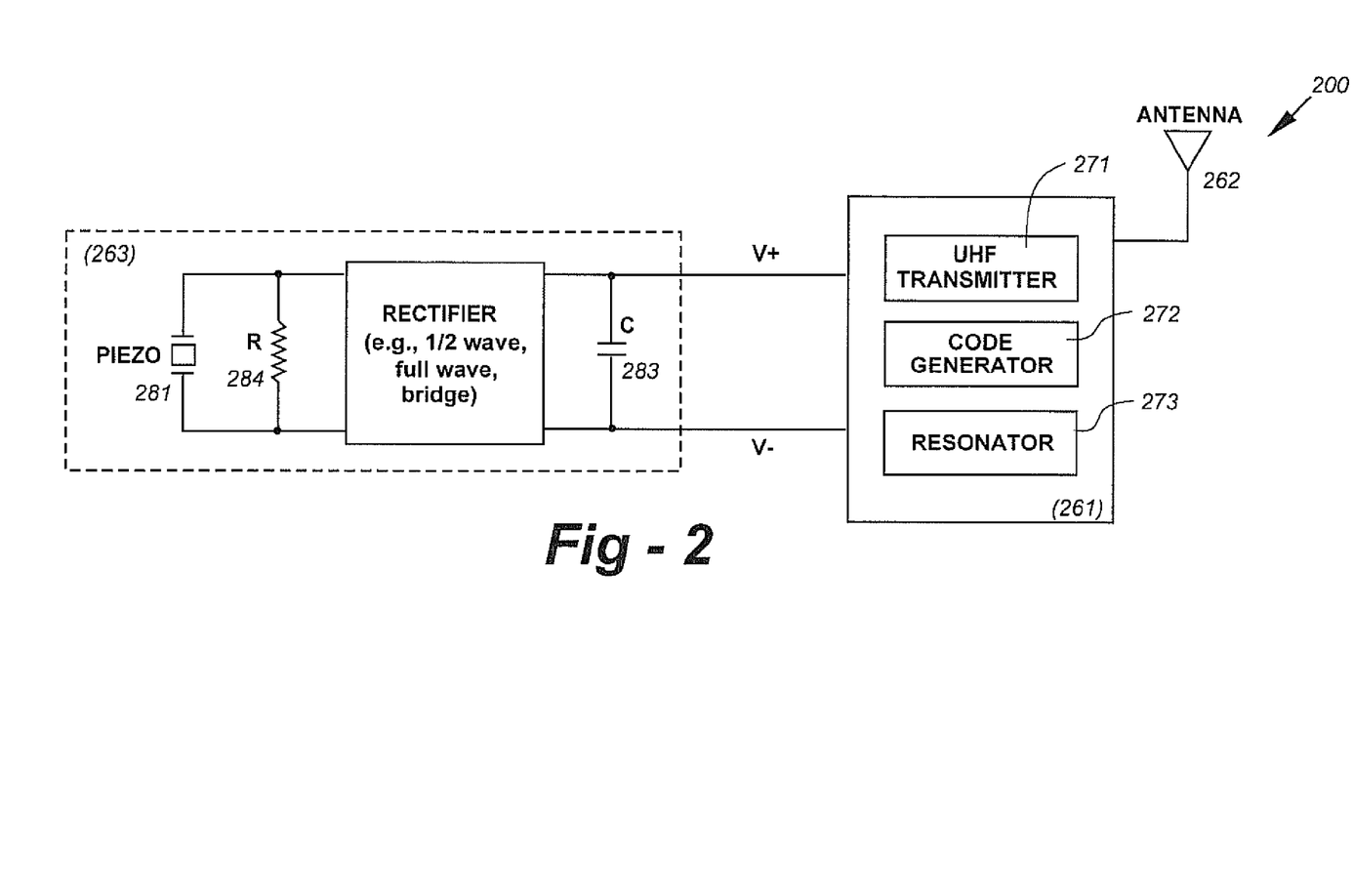
FIG. 2 is a schematic diagram illustrating a golf ball device arranged according to the present disclosure.

FIG. 2 is a schematic diagram illustrating a golf ball device (200) arranged according to the present disclosure. The golf ball device (200) includes a radio frequency transmitter system (261), an antenna (262) and an impact based power generator system (263). The radio frequency transmitter system (261) includes a UHF transmitter (271), a code generator (272) and a resonator (273). The impact based power generator system (263) includes a piezo-electric device (281), a rectifier circuit (282), a capacitor circuit (283), and an optional resistor circuit (284).

The UHF transmitter (271) is a radio frequency (RF) transmitter that is capable of transmitting modulated signals via antenna 262 in a frequency band that is matched by the receiver in the locator device (see FIG. 1 discussion above). UHF or ultra-high frequency band transmissions are typically in the range from 300 MHz to 3 GHz. The resonator (273) is arranged to provide an oscillation signal that is used by the UHF transmitter (271). The code generator (272) can be arranged to cooperate with the resonator (273) and/or the UHF transmitter (271) to encode signals for transmission.

The code generator (272) can be any appropriate means that assigns a code to the golf ball device for identification purposes. The code can be uniquely assigned to each golf ball device (200), uniquely assigned to a sleeve of golf ball devices (i.e. a package of three golf balls are commonly sold in a single package referred to as a sleeve), or otherwise assigned to golf ball devices as may be desired. The code generator (272) can be implemented, for example, as a binary code that is set by a series of fuse links (or anti-fuse links) that are programmed during the manufacturing process, as an RFID tag device that is programmed by an RFID encoded radio frequency transmission, either during or after manufacturing the golf ball device, or by any other reasonable means to assign a code to the golf ball device (200). A code reader (e.g., 290) such as an RFID reader device with a corresponding antenna (291) can optionally be arranged to read the code from the golf ball device (200) via an RFID coded radio frequency transmission (e.g., 292). Example golf ball devices may be assigned codes as a linear or remapped count, making as above each ball or sleeve of balls unique. The number of required unique codes can be reduced when balls that are shipped to various regions are given codes that are distributed across the regions such that each region might have only a single occurrence of a code conflict. The number of regions assigned may be any designation such as country, state, continent or any other reasonable designation. The codes can optionally be assigned to the RFID tag via an RFID coded radio frequency transmission signal.

An example resonator (273) can be any appropriate high-frequency oscillator such as an electro-magnetic resonator, a cavity-based resonator, a waveguide based resonator, a coil based resonator, a ceramic based resonator, a piezo electric quartz crystal resonator, a silicon based Micro Electro Mechanical Systems (MEMS) resonator, a dielectric based resonator, or any other equivalent circuit that operates as a resonator. The code generator (272) is arranged to provide a code that can be used as a part of a signal transmission to identify the golf ball to distinguish it from other golf balls. The signal transmission can be encoded, encrypted or scrambled so that reception is unintelligible without using the same code (e.g., a spread spectrum communication or a narrowband communication).

The piezo-electric device (281) in arranged to generate electrical energy in response to mechanical stress from the impact between the golf ball device (200) and a surface. The impact can be the result of hitting the golf ball device (281) with the surface of a golf club (not shown), or as a result of the golf ball device (281) striking an environmental surface such as the ground, a tree, etc. At least a portion of the kinetic energy from the impact with the golf ball device (200) causes a mechanical stress on the piezo-electric device (281), resulting in the generation of high-voltage spikes (e.g., in excess of 1000 V) that are coupled to the rectifier circuit (282). The rectifier circuit (282) is arranged to block reverse current flow and permit forward conduction to charge the capacitor circuit (283) using charges generated by the high-voltage spikes from the piezo-electric device (281). The energy stored in the capacitor circuit (283) serves as a power supply (V+, V−) for the radio frequency transmitter system (261) in the golf ball device (200). The rectifier circuit (282) can be any appropriate device or arrangement of devices including but not limited to a half wave rectifier, a full wave rectifier, or a bridge rectifier. The optional resistor circuit (284) can have a very high effective resistance value (e.g., 1 M-ohm) that is coupled in parallel with the piezo-electric device (284) to permit the charges in the piezo-electric device to return to their de-stressed/de-strained (hereinafter simply de-stressed) state after the impact and recoil from the mechanical stresses have subsided.

The piezo-electric device (281) can be any appropriate device that generates energy as a result of mechanical stress, such as a crystal material or a ceramic material. Mechanical stress on the golf ball device (200) acts as an impulse generator that disturbs the natural state of the piezo-electric device (281). A high-voltage spike (e.g., in excess of 1000 V) can be generated from the mechanical stress of impact. As the piezo-electric device (281) rebounds from the mechanical stress, a series of progressively decreasing amplitude positive and negative voltage spikes occur. The piezo-electric device (281) can be modeled as a resonant circuit such as an LC tank circuit, where the impact energy causes the resonant circuit to oscillate at a natural frequency (e.g., a crystals naturally occurring resonant frequency) for the piezo-electric device (281). The piezo-electric device (281) will eventually return to its resting state, where no oscillations occur.

As described above, the voltage spikes that are generated by the piezo-electric device can be considerable. These voltages spikes may be problematic for other circuits such as the radio frequency transmitter system (261). In this instance, another circuit can be interposed between the radio frequency transmitter system (261) and the impact based power generator system (263) such as by a voltage converter or limiter circuit (e.g., a DC-DC converter, a regulator, a peak limiter, etc.) so that inappropriate voltages are not coupled to the radio frequency transmitter system (261).

The efficiency of conversion from mechanical stress to electrical energy in a piezo device is not uniform and can be dependent upon the directional axis where the mechanical stress is applied. Additional piezo devices can be utilized in a variety of physical locations and orientations in the golf ball device to increase the energy efficiency as will be described below.

Figure 3:
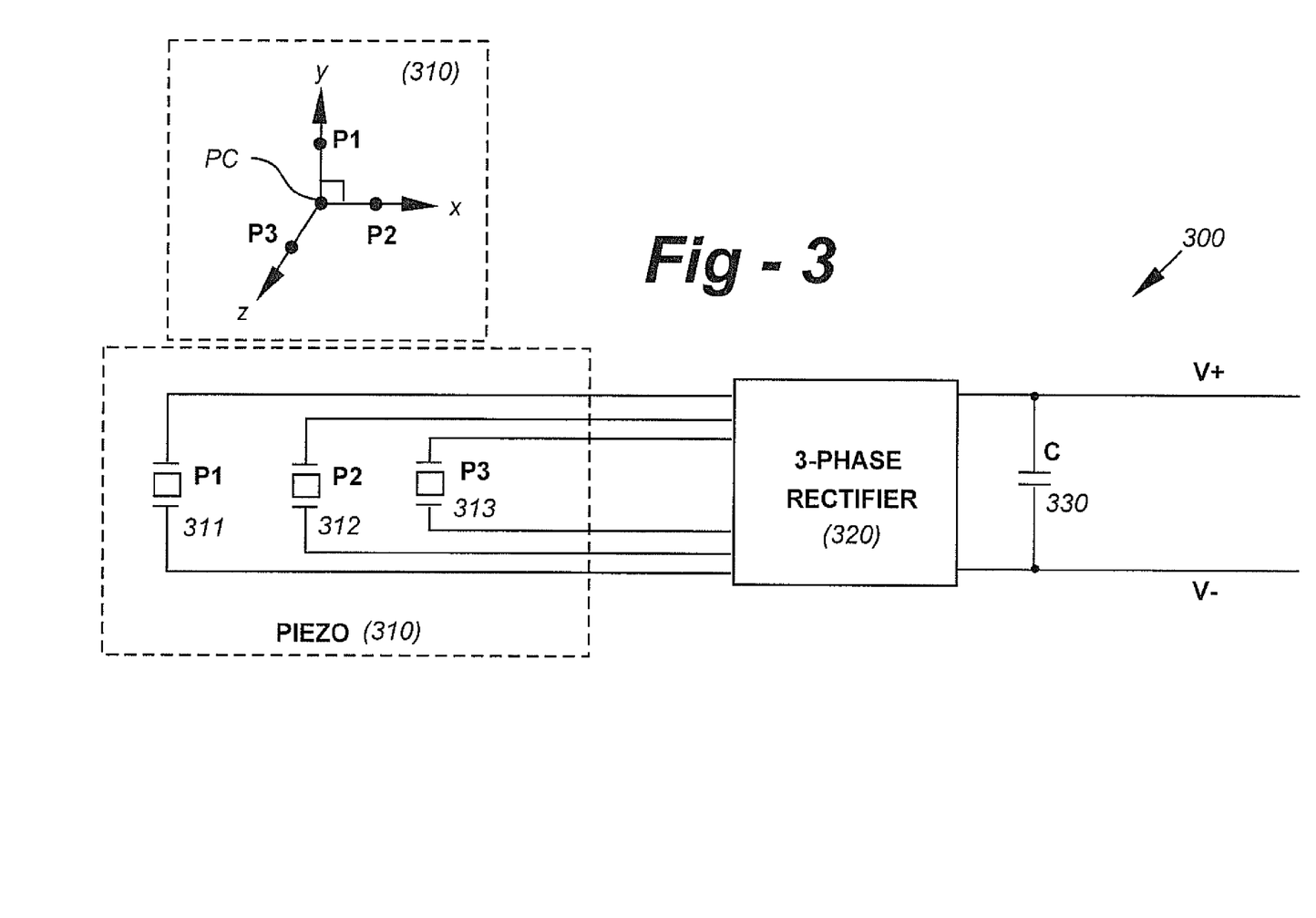
FIG. 3 is another schematic diagram illustrating another golf ball device arranged according to the present disclosure.

FIG. 3 is another schematic diagram illustrating another golf ball device (300) arranged according to the present disclosure. Similar to FIG. 2, the golf ball device (300) of FIG. 3 illustrates an impact based power generator system including a piezo-electric device (310), a rectifier circuit (320), and a capacitor circuit (330) that is arranged to serve as a power supply (V+, V−) for the radio frequency transmitter system (e.g., see FIG. 2) in the golf ball device (300).

For the example illustrated in FIG. 3, the piezo-electric device from FIG. 2 is replaced by three separate piezo-electric devices (311, 312 and 313). Each of the piezo-electric devices (311, 312 and 313) is coupled to the rectifier circuit (320). The rectifier circuit (320) is arranged as a three-phase rectifier circuit, where each piezo-electric device (311, 312 and 313) is associated with a different phase of the rectifier circuit (320). The rectifier circuit (320) can be arranged as any appropriate device that can rectify and combine the energy from the three piezo-electric devices at the capacitor circuit (330). In one example, each piezo-electric device (311, 312 and 313) has a separate rectifier circuit that shares a common output to the capacitor circuit. Separate resistor circuits (e.g., 284 of FIG. 2) can be placed in parallel with each piezo-electric device (284) to permit the charges in the piezo-electric devices (311, 312 and 313) to return to their de-stressed state after the impact and recoil from the mechanical stresses have subsided.

Also shown in FIG. 3, the piezo-electric devices (311, 312 and 313) are each in a different physical location (P1, P2 and P3) and orientation for energy conversion along an axis relative to the center (PC) of the golf ball device (300). In one example, piezo-electric device 311 is oriented for energy conversion along the y-axis at location P1, while piezo-electric device 312 is oriented for energy conversion along the x-axis at location P2, and piezo-electric device 313 is oriented for energy conversion along the z-axis at location P3. Each piezo-electric device (311, 312 and 313) is thus oriented such that maximum conversion of kinetic energy to electrical energy is achieved when the golf ball device (300) is impacted along the axis of the golf ball device (300) most aligned with the corresponding piezo-electric device. Although three devices are shown in the present example, any number of piezo-electric devices can be used to provide sufficient energy to power the various circuits. Moreover, the rectifier circuit can be represented as a multi-phase rectifier, where each phase is associated with a separate one of the piezo-electric devices.

Figure 4:
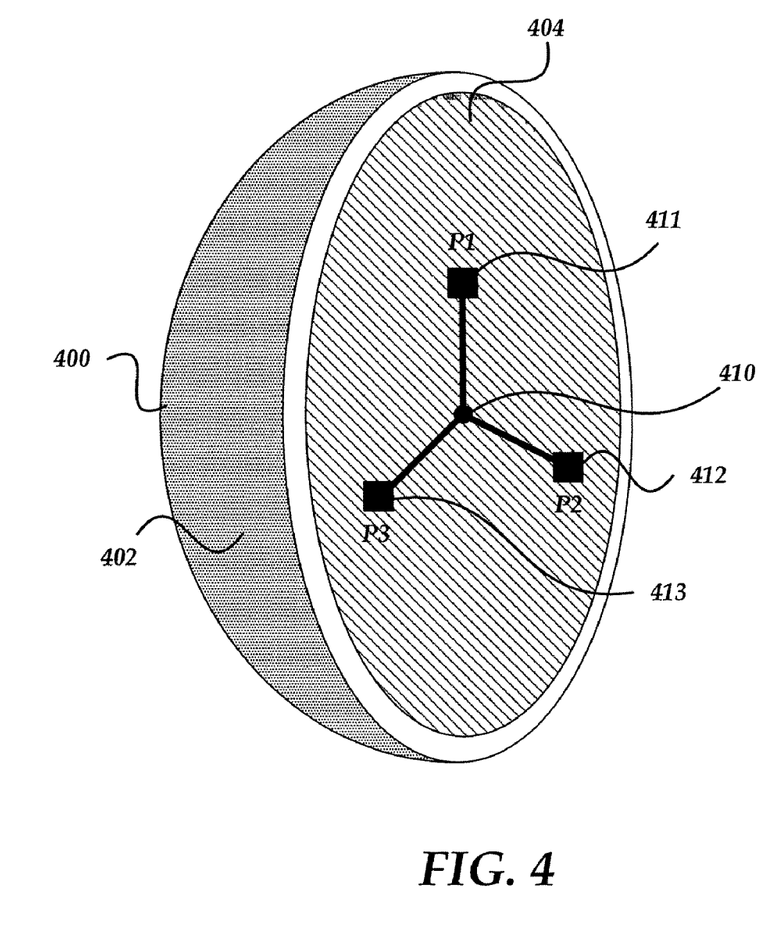
FIG. 4 is a cross-sectional view of a golf ball device arranged according to the present disclosure.

FIG. 4 is a cross-sectional view of a golf ball device (400) arranged according to the present disclosure. As shown in FIG. 4, the golf ball device (400) has an outer covering material (402), and an inner core material (404). Electronic circuits (410) are placed at the center of the inner core material (404) of the golf ball device (400) such as in the form of a system-on-chip (SOC) or integrated circuit (IC). Three piezo-electric devices (411-413) are couple to the electronic circuits (410), and oriented along separate axis (e.g., x, y, z) relative to the center of the inner core material (404). As described previously, the orientation and placement of each crystal at its relative position (P1, P2, and P3) is such that the maximum conversion of kinetic energy (e.g., a portion of the kinetic energy generated from impact between the golf ball device and a surface) to electrical energy is achieved.

Figure 5:
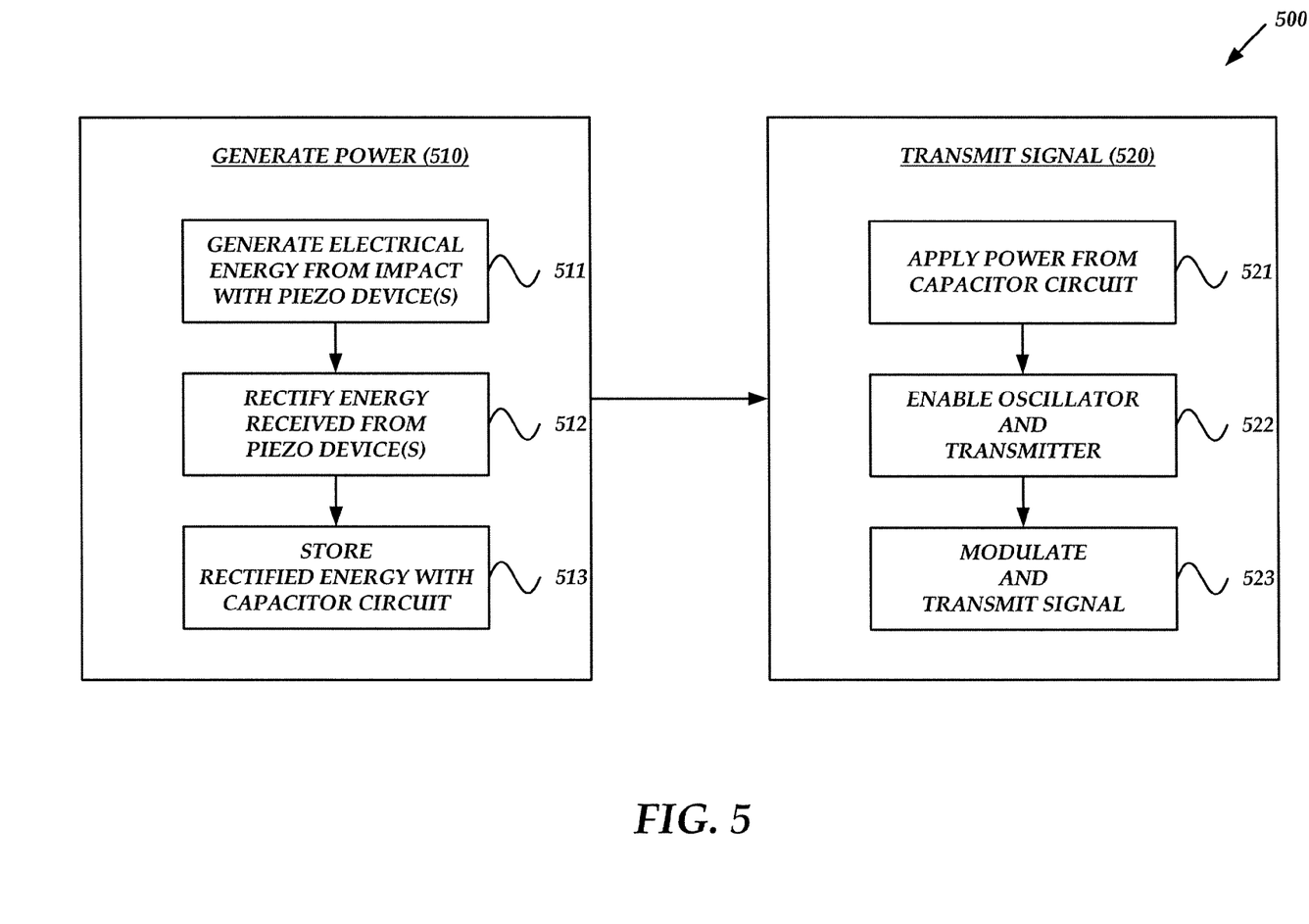
FIG. 5 is a process flow diagram for a golf ball device arranged according to the present disclosure.

FIG. 5 is a process flow diagram (500) for a golf ball device arranged according to the present disclosure. Process flow diagram 500 is divided into two main functional steps, namely a step to generate power (510) and a step for transmit signal (520).

Step 510 is broken into three functional blocks (511, 512 and 513). At block 511, electrical energy is generated using one or more piezo-electric devices from the mechanical stress resulting from the impact with the golf ball. At block 512, the energy from each piezo-device is rectified such as previously described. At block 513, the rectified energy from each piezo-device is combined and stored in a capacitor circuit. Although blocks 511-513 are illustrated as separate steps, all of the steps can be combined and/or separated into additional steps, and may in some instances occur simultaneously.

Step 520 is also broken into three functional blocks (521, 522 and 523). At block 521, power that is stored in the capacitor circuit is applied to the various electronic circuits in the golf ball device. At block 522, the resonator (e.g., a resonator that generates high-frequency oscillations) in the golf ball device is energized by the power from the capacitor circuit and the radio frequency transmitter is enabled to prepare for emitting signals. At block 523, the transmission of signals begins by modulating signals using the resonator and any other necessary components. Although blocks 521-523 are illustrated as separate steps, all of the steps can be combined and/or separated into additional steps, and may in some instances occur simultaneously.

Additional steps may also occur in the transmit signal (510) functional block such as: encoding a unique identifier in the transmitted signal for identification of the specific golf ball device, locking the transmit frequency to a specified frequency, or hopping between frequencies as in a spread spectrum communication. To conserve power, the oscillator may cooperate with various control circuits (e.g., logic and timing circuits) to disable transmission until it is time to transmit a signal. For example, a timer circuit can be used to periodically trigger a signal transmission at a regular interval over an extended period of time (e.g., a radio frequency transmitter is periodically enabled once per second over a 5-15 minutes time interval until all of the stored energy has been expended). For example, a 10 uF capacitor charged to 10 V holding 500 microjoules could power a transmitter for 600 us every second over approximately a 10 minute time interval (600 times), for a total transmitter on time of 360 milliseconds assuming that the transmitter used about 1 milliwatt.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A golf ball device that is arranged to emit a radio frequency transmission using energy generated from the impact of the golf ball device with a surface, the golf ball device comprising:

an antenna;

a radio frequency transmitter system that is located in a central area of an inner core of the golf ball device, wherein the radio frequency transmitter system includes an output that is coupled to the antenna, and wherein the radio frequency transmitter system is arranged to emit the radio frequency transmission via the antenna when powered;

an impact power generator that is located in the central area of the inner core of the golf ball device and arranged to generate power in response to impact of the golf ball with the surface, the impact power generator comprising a capacitor circuit, a rectifier circuit and a plurality of piezo-electric devices, wherein the piezo-electric devices are arranged to provide electrical energy to an input of the rectifier circuit in response to mechanical stresses on the piezo-electric devices from the impact of the golf ball with the surface, wherein an output of the rectifier circuit is coupled to the capacitor circuit, wherein the capacitor circuit is arranged to store charge such that the capacitor circuit acts as a temporarily power supply for the golf ball device; and wherein the piezo-electric devices include a first piezo-electric device aligned for maximal energy conversion along an x-axis relative to the central area of the inner core, a second piezo electric device aligned for maximal energy conversion along a y-axis relative to the central area of the inner core, and a third piezo electric device is aligned for maximal energy conversion along a z-axis relative to the central area of the inner core, whereby the x-axis, the y-axis, and the z-axis form an orthogonal set.

2. The golf ball device of claim 1, wherein the radio frequency transmitter system is arranged to emit high-frequency energy in the range of approximately 300 MHz to 3 GHz.

3. The golf ball device of claim 1, wherein the radio frequency transmitter system is arranged to emit either a narrowband transmission or a spread spectrum transmission.

4. The golf ball device of claim 1, wherein the radio frequency transmitter system is arranged to modulate signals for transmission, wherein the modulation comprises one or more of:
amplitude modulation, frequency modulation, pulse modulation and phase modulation.

5. The golf ball device of claim 1, the radio frequency transmitter system comprising:
a UHF transmitter and a code generator that are arranged to cooperate with one another to encode the radio frequency transmission with an identifier provided by the code generator such that the golf ball device can be distinguished from other devices by the identifier.

6. The golf ball device of claim 5, wherein the code generator includes an RFID tag.

7. The golf ball device of claim 6, wherein the RFID tag is programmed by an RFID coded radio frequency transmission.

8. The golf ball device of claim 6, wherein the RFID tag is arranged to respond to an RFID coded radio frequency transmission provided by an RFID reader such that the identifier provided by the code generator is communicated back to the RFID reader.

9. The golf ball device of claim 1, the radio frequency transmitter system comprising:
a resonator that is arranged to provide a high-frequency oscillation signal for the radio frequency transmitter system, wherein the resonator comprises one of an electro-magnetic resonator, a cavity-based resonator, a waveguide based resonator, a coil based resonator, a ceramic based resonator, a dielectric based resonator, a quartz crystal resonator, a silicon based MEMS resonator, or any combination thereof.

10. The golf ball device of claim 1, the radio frequency transmitter system comprising:
a control circuit that is arranged to selectively disable transmissions until it is time to transmit a signal such that power usage is conserved.

11. The golf ball device of claim 1, the rectifier circuit comprising one of:
a half wave rectifier, a full wave rectifier, and a bridge rectifier.

12. The golf ball device of claim 1, the an impact power generator further comprising a resistor that is coupled in parallel with each piezo-electric device such that charges in the piezo-electric devices return to their de-stressed state after the mechanical stresses have subsided.

13. The golf ball device of claim 1, the piezo-electric devices in the impact power generator comprising one of a piezo-electric crystal material, a piezo-electric ceramic material, or a piezoelectric plastic film material.

14. The golf ball device of claim 1, the piezo-electric devices comprise a material from the group consisting of: tourmaline, quartz, topaz, cane sugar, Rochelle salt, berlinite, gallium orthophosphate, perovskite, plastic films, and tungsten-bronze.

15. The golf ball device of claim 1, wherein the rectifier circuit comprises a respective rectifier that is coupled to a corresponding one of the piezo-electric devices, where each respective rectifier is coupled in common to the capacitor circuit.

16. The golf ball device of claim 1, wherein the rectifier circuit comprises a three-phase rectifier circuit.

17. The golf ball device of claim 1, the impact power generator further comprising a resistor that is coupled in parallel with the piezo-electric device, a second resistor that is coupled in parallel with the second piezo-electric device, and a third resistor that is coupled in parallel with the third piezo-electric device, wherein each resistor is arranged such that charges in the piezo-electric devices return to their de-stressed state after the mechanical stresses in each respective piezo-electrical device has subsided.

18. A method for emitting a radio frequency transmission from a golf ball device in response to the impact of the golf ball device with a surface, the method for the golf ball device comprising:
arranging a plurality of piezo-electric devices along separate axes relative to a center of the golf ball device such that each piezo-electric device is oriented for maximal energy conversion along a separate axis relative to the central area of the inner core of the golf ball device such that that maximum conversion of kinetic energy to electrical energy is achieved when the golf ball device is impacted along the axis of the golf ball device most aligned with the corresponding piezo-electric device;
generating electrical energy with piezo-electric devices in response to mechanical stresses on the piezo-electric devices from the impact of the golf ball with the surface;
rectifying the electrical energy generated by the piezo-electric devices and combining the energy from each of the plurality of piezo-electric devices;
storing charge from the rectified and combined electrical energy in a capacitor circuit, wherein the capacitor circuit is arranged to operate as a temporary power supply for the golf ball device;
applying power from the temporary power supply to a radio frequency transmitter system that is located in a central area of the inner core of the golf ball device, wherein the radio frequency transmitter system includes an output that is coupled to an antenna;
enabling high-frequency oscillations in the radio frequency transmitter system when the temporary power supply is operational such that the radio frequency transmitter system is prepared for emission of radio frequency transmissions; and
modulating signals with the high frequency oscillations when the temporary power supply is operational such that the radio frequency transmission is emitted by the radio-frequency transmitter system via the antenna as a modulated signal.

19. The method of claim 18, wherein the radio frequency transmitter system is arranged to emit either a narrowband transmission or a spread spectrum transmission.

20. The method of claim 18, wherein modulating signals comprises modulating according to a modulation method from the group consisting of amplitude modulation, frequency modulation, pulse modulation and phase modulation, and combinations thereof.

21. The method of claim 18, wherein modulating comprises encoding the radio frequency transmission with an identifier such that the golf ball device can be distinguished from other devices by the identifier in the radio frequency transmission.

22. The method of claim 18, further comprising selectively disabling transmissions until it is time to transmit a signal such that power usage from the temporary power supply is conserved.

23. The method device of claim 18, wherein rectifying comprises a rectification method from the group consisting of: the rectifier circuit comprising one of: half wave rectification, full-wave rectification, bridge rectification and multiphase rectification.

24. The method of claim 18, further comprising coupling a resistance in parallel with each piezo-electric device such that charges in the piezo-electric device return to a de-stressed state after the mechanical stresses have subsided.

25. The method of claim 18, the piezo-electric devices comprising one of a piezo-electric crystal material or a piezo-electric ceramic material.

26. The method of claim 18, the piezo-electric devices comprise a material from the group consisting of: tourmaline, quartz, topaz, cane sugar, Rochelle salt, berlinite, gallium orthophosphate, perovskite, piezo-electric plastic film, and tungsten-bronze.

27. The method of claim 18, wherein generating electrical energy with the piezo-electric devices further comprises:
   arranging a plurality of piezo-electric devices along separate axis relative to a center of the golf ball device such that each piezo-electric device is oriented for maximal energy conversion along a separate axis relative to the central area of the inner core of the golf ball device such that that maximum conversion of kinetic energy to electrical energy is achieved when the golf ball device is impacted along the axis of the golf ball device most aligned with the corresponding piezo-electric device, and wherein rectifying the energy generated by the piezo-electric device further comprises rectifying and combining the energy from each of the plurality of piezo-electric devices.

* * * * *